(12) United States Patent
Donderici (10) Patent No.: US 10,119,389 B2
(45) Date of Patent: Nov. 6, 2018

(54) DRILLING COLLISION AVOIDANCE APPARATUS, METHODS, AND SYSTEMS

(71) Applicant: Halliburton Energy Services, Inc., Houston, TX (US)

(72) Inventor: Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 314 days.

(21) Appl. No.: 14/432,647

(22) PCT Filed: Dec. 27, 2013

(86) PCT No.: PCT/US2013/078120
§ 371 (c)(1),
(2) Date: Mar. 31, 2015

(87) PCT Pub. No.: WO2015/099790
PCT Pub. Date: Jul. 2, 2015

(65) Prior Publication Data
US 2016/0265343 A1    Sep. 15, 2016

(51) Int. Cl.
*E21B 47/022* (2012.01)
*G01V 3/26* (2006.01)
(Continued)

(52) U.S. Cl.
CPC ........... *E21B 47/09* (2013.01); *E21B 7/04* (2013.01); *E21B 43/305* (2013.01); *E21B 47/02* (2013.01);
(Continued)

(58) Field of Classification Search
CPC ... G01V 3/20; G01V 3/22; G01V 3/24; G01V 3/26; G01V 3/18; G01V 3/02;
(Continued)

(56) References Cited

U.S. PATENT DOCUMENTS

| 3,838,335 A | 9/1974 | Miller |
| 4,372,398 A * | 2/1983 | Kuckes .................. E21B 47/02 166/66.5 |

(Continued)

FOREIGN PATENT DOCUMENTS

| AU | 2013408734 A1 * | 5/2016 | ........... E21B 43/305 |
| AU | 2013408734 B2 * | 6/2017 | |

(Continued)

OTHER PUBLICATIONS

"Australian Applicaton Serial No. 2013408734, Examination Report No. 1 dated Jul. 23, 2016", 3 pgs.

(Continued)

*Primary Examiner* — Jermele M Hollington
*Assistant Examiner* — Sean Curtis
(74) *Attorney, Agent, or Firm* — Gilliam IP PLLC (57) ABSTRACT

Apparatus, systems, and methods may include a magnetic dipole transmitter to be located in a ranging well. A voltage measurement device can include a plurality of probes where each probe is to be located on one of a target well, the ranging well or a surface of a geological formation comprising the ranging well and the target well. A controller coupled to the voltage measurement device calculates a distance or relative direction between the target well and the ranging well based on a voltage difference between the plurality of probes. The distance/direction can be used to control drilling operations. Additional apparatus, systems, and methods are disclosed.

29 Claims, 9 Drawing Sheets (51) Int. Cl.
  *E21B 47/09* (2012.01)
  *E21B 43/30* (2006.01)
  *E21B 7/04* (2006.01)
  *E21B 47/02* (2006.01)
  *E21B 47/12* (2012.01)
  *G01V 3/20* (2006.01)

(52) U.S. Cl.
  CPC ...... *E21B 47/02216* (2013.01); *E21B 47/122* (2013.01); *G01V 3/20* (2013.01)

(58) Field of Classification Search
  CPC ........ G01V 3/0811; G01V 3/121; G01V 3/00; G01V 9/00; G01N 33/2823; G01N 33/241; E21B 47/09; E21B 7/04; E21B 47/02; E21B 47/02216; E21B 47/122; E21B 43/305; E21B 49/0051; E21B 49/08
  USPC ........... 324/144, 244–245, 323–377, 750.12; 175/44–45
  See application file for complete search history.

(56) References Cited

U.S. PATENT DOCUMENTS

| | | | |
|---|---|---|---|
| 5,064,006 A | 11/1991 | Waters | |
| 5,187,440 A * | 2/1993 | Vail, III | G01V 11/00 324/368 |
| 5,218,301 A * | 6/1993 | Kuckes | E21B 47/02 324/207.26 |
| 5,329,448 A * | 7/1994 | Rosthal | G01V 3/28 324/339 |
| 5,485,089 A * | 1/1996 | Kuckes | G01V 3/26 175/45 |
| 5,589,775 A * | 12/1996 | Kuckes | E21B 47/02216 166/66.5 |
| 5,923,170 A | 7/1999 | Kuckes | |
| 6,188,223 B1 * | 2/2001 | Van Steenwyk | G01V 3/20 175/50 |
| 6,396,276 B1 * | 5/2002 | Van Steenwyk | E21B 47/122 175/50 |
| 6,765,387 B2 * | 7/2004 | Prammer | G01V 3/24 324/366 |
| 7,617,049 B2 * | 11/2009 | McElhinney | E21B 47/022 702/14 |
| 7,812,610 B2 * | 10/2010 | Clark | E21B 47/02216 324/338 |
| 8,011,451 B2 * | 9/2011 | MacDonald | E21B 43/24 175/45 |
| 8,063,641 B2 * | 11/2011 | Clark | E21B 47/02216 324/345 |
| 8,113,298 B2 * | 2/2012 | Kuckes | E21B 47/022 175/315 |
| 8,427,162 B2 * | 4/2013 | Bespalov | E21B 47/022 324/326 |
| 8,638,103 B2 * | 1/2014 | Rosthal | G01V 3/30 324/337 |
| 8,773,278 B2 * | 7/2014 | Contant | E21B 17/003 166/250.01 |
| 8,800,684 B2 * | 8/2014 | Krueger | E21B 43/305 166/255.2 |
| 9,035,657 B2 * | 5/2015 | Zhang | G01V 3/28 324/323 |
| 9,291,739 B2 * | 3/2016 | Clark | E21B 47/02216 |
| 9,506,326 B2 * | 11/2016 | Hay | E21B 17/1078 |
| 9,638,028 B2 * | 5/2017 | Gao | E21B 47/121 |
| 10,001,006 B2 * | 6/2018 | Donderici | E21B 47/02216 |
| 2002/0105332 A1 * | 8/2002 | Rosthal | G01V 3/28 324/338 |
| 2003/0122547 A1 * | 7/2003 | Prammer | G01V 3/24 324/368 |
| 2003/0184302 A1 * | 10/2003 | Omeragic | G01V 3/28 324/338 |
| 2004/0124841 A1 * | 7/2004 | Omeragic | G01V 3/28 324/337 |
| 2005/0083063 A1 * | 4/2005 | Omeragic | G01V 3/28 324/338 |
| 2008/0177475 A1 * | 7/2008 | McElhinney | E21B 47/022 702/6 |
| 2009/0194333 A1 * | 8/2009 | MacDonald | E21B 43/24 175/45 |
| 2009/0308657 A1 * | 12/2009 | Clark | E21B 47/02216 175/45 |
| 2010/0044108 A1 * | 2/2010 | Bespalov | E21B 47/022 175/24 |
| 2010/0155139 A1 * | 6/2010 | Kuckes | E21B 47/02216 175/45 |
| 2010/0259267 A1 * | 10/2010 | Rosthal | G01V 3/30 324/339 |
| 2010/0259268 A1 * | 10/2010 | Zhang | G01V 3/28 324/339 |
| 2011/0088890 A1 * | 4/2011 | Clark | E21B 47/02216 166/66.5 |
| 2011/0139507 A1 * | 6/2011 | Krueger | E21B 43/305 175/45 |
| 2011/0282583 A1 * | 11/2011 | Clark | G01V 3/26 702/6 |
| 2012/0013339 A1 * | 1/2012 | Kuckes | E21B 47/02216 324/346 |
| 2012/0068712 A1 * | 3/2012 | Taherian | G01V 1/282 324/338 |
| 2012/0139530 A1 * | 6/2012 | McElhinney | E21B 47/02216 324/207.13 |
| 2012/0256634 A1 * | 10/2012 | Morys | E21B 43/25 324/338 |
| 2013/0057287 A1 * | 3/2013 | Le | E21B 47/0905 324/346 |
| 2013/0319659 A1 * | 12/2013 | Freedman | E21B 7/04 166/250.01 |
| 2013/0341092 A1 * | 12/2013 | Hay | E21B 7/04 175/24 |
| 2014/0111210 A1 * | 4/2014 | Fang | E21B 47/0905 324/346 |
| 2014/0191120 A1 * | 7/2014 | Donderici | E21B 47/123 250/265 |
| 2014/0191761 A1 * | 7/2014 | San Martin | E21B 47/011 324/339 |
| 2015/0083409 A1 * | 3/2015 | Hay | E21B 17/1078 166/254.1 |
| 2015/0268371 A1 * | 9/2015 | Donderici | G01V 3/26 324/346 |
| 2016/0025887 A1 * | 1/2016 | Rodney | E21B 47/02 324/339 |
| 2016/0061027 A1 * | 3/2016 | Gao | E21B 47/121 702/7 |
| 2016/0097272 A1 * | 4/2016 | Moss | E21B 43/2406 324/346 |
| 2016/0116623 A1 * | 4/2016 | Golla | G01V 3/38 324/346 |
| 2016/0168977 A1 * | 6/2016 | Donderici | E21B 47/024 175/45 |
| 2016/0202382 A1 * | 7/2016 | Dyas | G01V 3/28 324/339 |
| 2016/0258275 A1 * | 9/2016 | Wu | G01V 3/26 |
| 2016/0258276 A1 * | 9/2016 | Donderici | E21B 47/02216 |
| 2016/0258284 A1 * | 9/2016 | Bittar | E21B 41/0035 |
| 2016/0265343 A1 * | 9/2016 | Donderici | E21B 43/305 |
| 2016/0273337 A1 * | 9/2016 | Donderici | E21B 47/02216 |
| 2016/0273345 A1 * | 9/2016 | Donderici | E21B 7/04 |
| 2017/0081956 A1 * | 3/2017 | Ganguly | E21B 47/122 |

FOREIGN PATENT DOCUMENTS

| | | | | |
|---|---|---|---|---|
| CA | 2930531 A1 * | 7/2015 | ........... | E21B 43/305 |
| GB | 2534748 A * | 8/2016 | ........... | E21B 43/305 |
| JP | 2006162406 A | 6/2006 | | |
| KR | 101043098 B1 | 6/2011 | | |

(56) References Cited

FOREIGN PATENT DOCUMENTS

| RU | 2016115367 A | * | 10/2017 | |
|---|---|---|---|---|
| WO | WO-2015/099790 A1 | | 7/2015 | |
| WO | WO 2015099790 A1 | * | 7/2015 | ........... E21B 43/305 |

OTHER PUBLICATIONS

"International Application Serial No. PCT/US2013/078120, International Preliminary Report on Patentability dated Jul. 7, 2016", 12 pgs.

"Malaysian Application Serial No. P I2016701437, Preliminary Examination dated Jun. 13, 2016", 2 pgs.

"International Application Serial No. PCT/US2013/078120, International Search Report dated Sep. 25, 2014", 3 pgs.

"International Application Serial No. PCT/US2013/078120, Written Opinion dated Sep. 25, 2014", 10 pgs.

"Canadian Application Serial No. 2,930,531, First Office Action dated Apr. 24, 2017.", 4 pages.

"United Kingdom Application Serial No. 1606925.4, Office Action dated Feb. 9, 2017.", 5 pages.

"United Kingdom Application Serial No. 1606925A, Office Action dated Oct. 4, 2017.", 5 pages.

United Kingdom Application Serial No. 1606925.4; Examination Report under Section 18(3); dated Jul. 12, 2018, 4 pages.

Canadian Second Examiner's Letter Application Serial No. 2930531, dated Feb. 1, 2018, 5 pages.

United Kingdom Application Serial No. 1606925.4, Office Action; dated Mar. 7, 2018, 4 pages.

* cited by examiner

DRILLING COLLISION AVOIDANCE APPARATUS, METHODS, AND SYSTEMS

PRIORITY APPLICATIONS

This application is a U.S. National Stage Filing under 35 U.S.C. 371 from International Application No. PCT/US2013/078120, filed on 27 Dec. 2013, which application is incorporated herein by reference in its entirety.

BACKGROUND

Currently, it is relatively difficult and potentially expensive to steer a drill bit through a field crowded with producing oil wells as a part of constructing a new well, without interrupting production of any of the other wells in the field.

DETAILED DESCRIPTION

As the easy-to-access and easy-to-produce hydrocarbon resources depleted the remaining wells are more difficult to access. Moreover, the world hydrocarbon demand is continuously growing, Meeting this demand can use development of more advanced recovery procedures such as a steam assisted gravity drainage (SAGD) application. SAGD addresses the mobility problem of the heavy oil wells by injection of high pressure and high temperature steam which reduces viscosity of the oil and allows easy extraction. This injection is performed from a wellbore (e.g., injector well, ranging well) that is drilled parallel to the producing well (e.g., target well) at a distance on the order of a few meters from each other. The placement of the ranging well should be achieved with very small margin in distance, since getting it too close would expose the producing well to very high pressure and temperature and getting it too far would reduce efficiency of the process. Traditional surveying techniques may suffer from a widening cone of uncertainty as the well gets longer and they cannot achieve the precision in placement that is used in this application.

Various embodiments disclosed herein utilize a combination of magnetic dipole transmitters and electrode-based voltage measurements. The magnetic dipole transmitters can be located downhole and/or at the surface of a geological formation. When compared to a surface-type excitation, the various embodiments do not produce unwanted induction signals at the receivers due to magnetic sensor rotation with respect to earth. This allows ranging measurements to be taken while rotating which can remove one of the limitations of ranging applications.

As used herein, a target well may be an abandoned or a producing oil or gas well which exists in a field and is to be avoided by a later well being drilled. A target well may also be an existing well that has blown out, and is to be intercepted at a selected depth below the surface of the earth by a relief borehole. Alternatively, the target well may represent some other anomaly located in the earth, such as an electrically conductive geological formation, a well pipe, a drill string in an uncased well, or some other electrically conductive material which may be a target for interception or avoidance. For purposes of this disclosure, such material will be referred to as the target well or the target well pipe.

Near the target well may be a second borehole that is being drilled, and which is to be directed so as either to intersect the target well or to avoid it. For convenience, the second borehole will be referred to as a ranging well. The ranging well typically begins at a wellhead at the surface of the earth, and may be relatively close to the wellhead of the target well, or may be spaced by a distance. At the wellhead, subsections or drill collars are secured end to end to form a drill string, and are lowered into the well as drilling progresses in a conventional manner. Drilling mud can be supplied to the interior bore of the string by way of fittings, again in conventional manner.

A ranging device can include two parts: (1) a magnetic dipole transmitter apparatus that generates alternating currents (AC) on a target well pipe and (2) a receiver with electrodes that measure the absolute and differential voltages, due to these pipe AC currents, from electrodes deployed at a wellhead, at a shallow depth near the surface of the geological formation, and/or in contact with the target well. The magnetic dipole transmitter apparatus can be deployed as part of a logging tool downhole in the ranging well. Relative distance and direction from the ranging well to the target well can be determined by analyzing the measured voltages based on absolute and magnetic dipole differential excitations.

Magnetic dipole transmitters, operating at relatively low frequencies (e.g., 0.02-250 Hz) can be used to induce the AC on the target well. One or more magnetic dipole transmitters can be used as part of the magnetic dipole transmitter apparatus to generate the AC.

Figure 1:
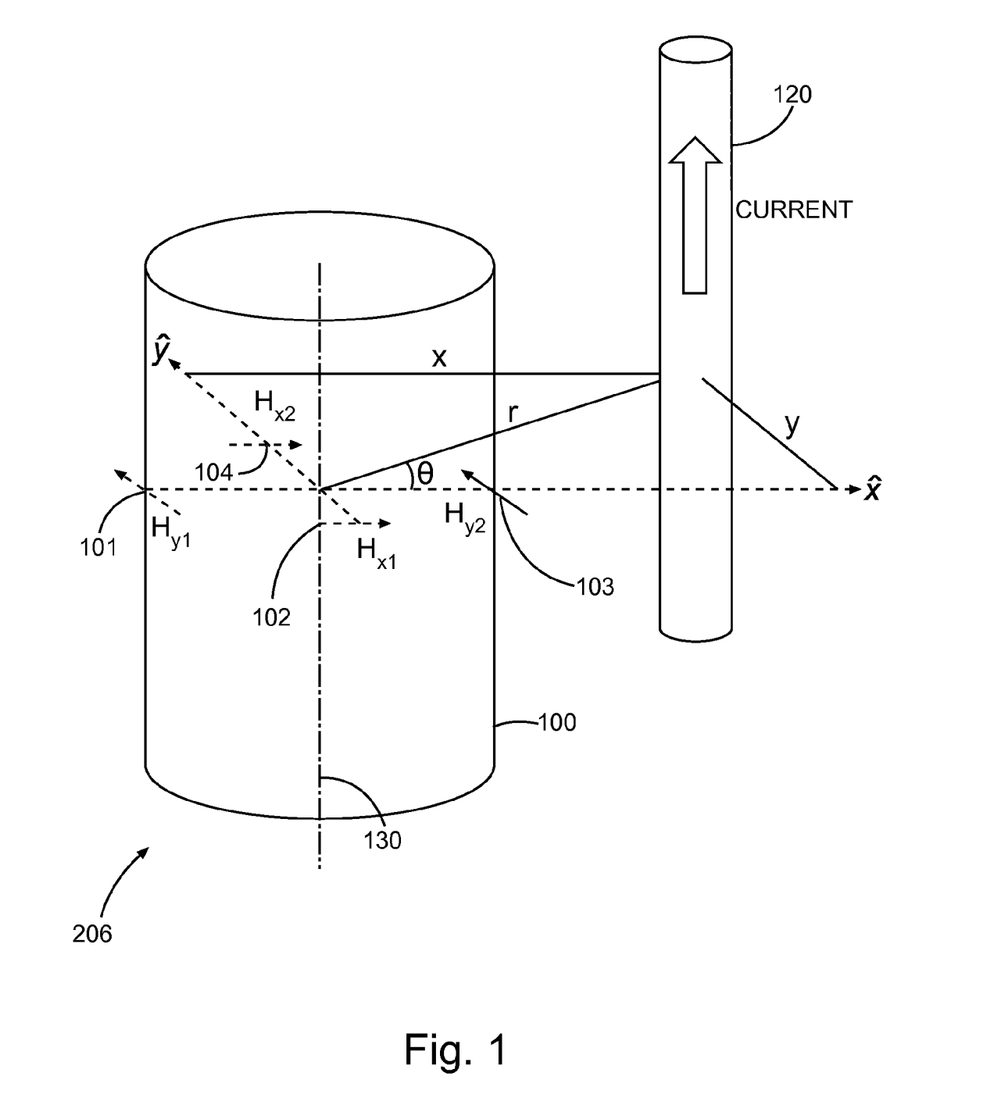
FIG. 1 illustrates an embodiment of one or more magnetic dipole transmitter configurations.

FIG. 1 illustrates an embodiment of a magnetic dipole transmitter apparatus 206 configuration using one magnetic dipole transmitter 103, as represented by $H_{y2}$, located in a ranging well 100 to induce an AC current on a target well 120. In an embodiment where measurements are being taken while the transmitter is rotating, a single physical magnetic dipole transmitter 103 can be used to synthesize four magnetic dipole results 101-104 at different rotation angles if the measurements are binned. The four magnetic dipole results 101-104 are represented by $H_{x1}$, $H_{x2}$, $H_{y1}$, and $H_{y2}$. FIG. 1 shows the synthesized magnetic dipole transmitters 101, 102, 104 are represented by dotted lines, while the physical magnetic dipole transmitter 103 is represented by a solid line. Alternatively all magnetic dipole transmitters can be physical. For example, each magnetic dipole transmitter 101-104 can be a physical magnetic dipole transmitter. While a more electrically complicated system, having physical magnetic dipole transmitters may reduce errors due to synthesis operations.

The magnetic dipole transmitters 101-104 can be located towards an outer surface of the logging tool. If more than one physical magnetic dipole transmitter 101-104 is used, they can be separated radially from other magnetic dipole transmitters and located a substantially equal distance from an axial centerline 130 of the ranging well 100 but on an opposite side of the ranging well 100 from an opposing magnetic dipole transmitters.

The magnetic dipole transmitters 101-104 can induce closed electric field lines in the geological formation and currents across the target well pipe 120. Induced currents, at such low relative frequencies, can reach distances greater than 10000 feet. Thus, such an implementation works well for a SAGD application.

Magnetic dipole transmitters 101-104 are, in some instances, operated in a differential mode, where voltage readings at different dipole rotation angles are subtracted. In order to improve the voltage signal levels corresponding to the differential readings, magnetic dipole transmitters can be placed as far as possible from the axial centerline of the tool. In addition, magnetic dipoles in opposite sides of the tool axis, (i.e., those that are separated by 180 degrees) can be used in subtraction. Another embodiment to obtain differential excitation is to place an antenna 101, 103 with opposite windings on two sides of the tool. This can physically balance the currents and help calibration of the tool.

In order to improve the drill bit steering performance, magnetic dipole transmitters 101-104 can be placed as close as possible to the bit (e.g., next to it). In the SAGD application, a drill string disposed in the ranging well 100 may be substantially parallel to the target pipe 120, so placement of the magnetic dipole transmitters 101-104 may be less important in terms of steering performance. Other embodiments place the magnetic dipole transmitters elsewhere on the drill string, such as in the bit.

Figure 2A:
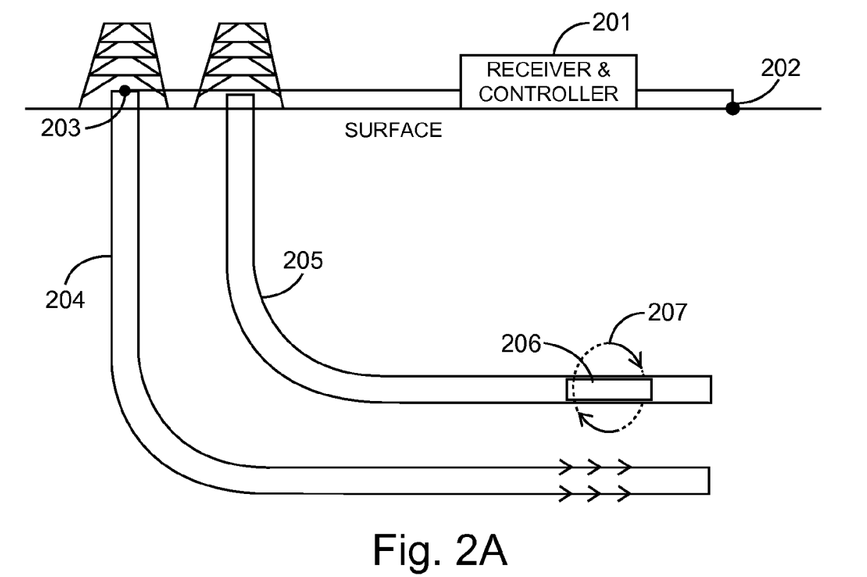
FIGS. 2A and 2B illustrate an embodiment of a ranging system showing various electrode placements.
Figure 2B:
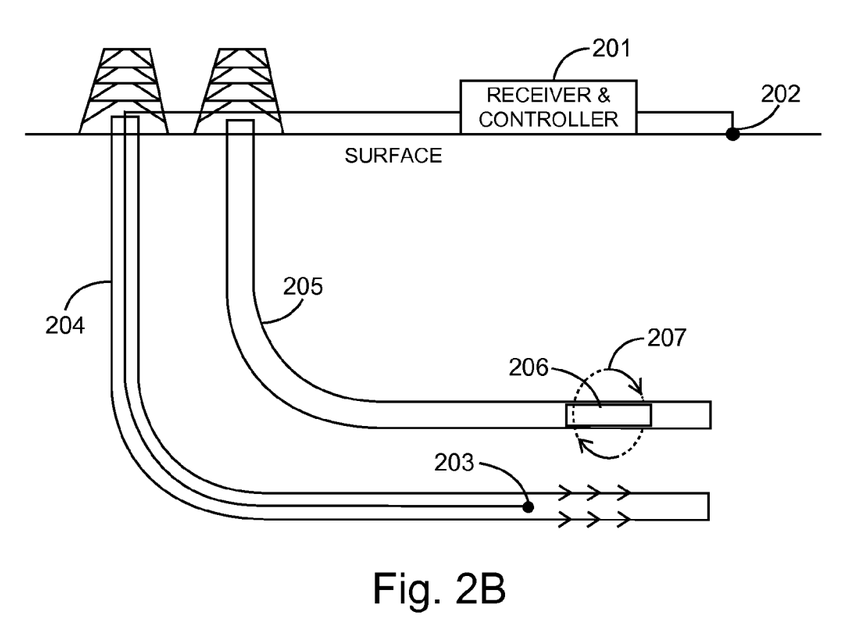

FIGS. 2A and 2B illustrate an embodiment of a ranging system showing various electrode placements. The ranging system can include a receiver and controller 201 coupled to a plurality of electrodes 202, 203. The receiver and controller 201 can include a voltmeter to measure absolute and differential voltages between the electrodes 202, 203. The receiver and controller 201 can also include control circuitry for controlling operation of the system as well as executing any ranging methods, such as that illustrated in FIG. 5. The embodiments of FIGS. 2A and 2B are for purposes of illustration only as other systems and other locations for the electrodes can be used.

Both FIGS. 2A and 2B show the target well 204 and the ranging well 205. The magnetic dipole transmitter apparatus 206, that comprises the one or more magnetic dipole transmitters 101-104, is shown located in the ranging well 205. The magnetic dipole transmitter apparatus 206 can generate an AC on the ranging well pipe 205 in order to generate an electric field 207 that can create the voltage differential as measured by the electrodes 202, 203.

In the embodiment illustrated in FIG. 2A, the first electrode 202 is located at the surface of the geological formation. The second electrode 203 is connected to the target well 204. For example, the electrode 203 can be connected by insulated wire to the well-head or area surrounding the well head for the target well 204. If connected to the area surrounding the target well head, the electrode can be located at relatively shallow depths (e.g., <6 m). In this embodiment, the voltage measurement is made across the pipe through the wellhead and shallow geological formations.

In the embodiment illustrated in FIG. 2B, the first electrode 202 is located at the surface of the geological formation. The second electrode 203 is located in the target well pipe 204. In this embodiment, the voltage measurement is made using an insulated cable that is deployed in the target pipe, preferably in the vicinity of the area that is targeted for SAGD drilling.

In both embodiments illustrated in FIGS. 2A and 2B, the measured voltage difference is indicative of the magnitude of currents induced on the target well pipe 204. In order to minimize the resistance of the load that is connected to the source, the electrode contact can be designed to reduce electrode resistance as much as possible. Reducing the load can improve the signal to noise ratio of the voltage measurement. In the embodiment of downhole electrodes, a mechanical clamp can be used. In a horizontal or substantially horizontal section of a well, a long piece of conductive material, as part of the electrode, can be coupled to a low side of the pipe and can be pushed against the pipe with the help of gravity.

An unexpected variation in the pipe current distribution may result in relatively small measured voltages between the electrodes or reversing of the sign of the measured voltage. The problem with the small measured voltages can be addressed by utilizing a different excitation frequency of the AC or a position of the magnetic dipole transmitter apparatus that is expected to produce a different current distribution on the ranging well pipe. The problem with the voltage sign reversal can be detected based on a comparison between past voltage measurements or different frequency or moving the transmitter positions.

Excitation of the target well by a single magnetic dipole transmitter can be illustrated by the following equations where r is the distance the single magnetic dipole transmitter is from the z-oriented target well pipe. The voltage difference across two far away end points of the target well pipe can be approximated as follows:

$$V = \int_C E dl \approx K E_z r \tag{1}$$

where V is the approximate voltage, E is the electric field vector, C is the contour along pipe, $E_z$ is the z-component of the electric field at the pipe position that is closest to the magnetic dipole and K is a proportionality factor that depends on formation and pipe properties. In the case of a single x-axis directed magnetic dipole transmitter in the geometry as shown in FIG. 1, the voltage generated across two points in a homogeneous formation can be written as $$V^{Hx} = -j\frac{\beta K I_m l \sin(\theta)}{4\pi}\left(1 + \frac{1}{j\beta r}\right)e^{-j\beta r} \tag{2}$$

$$\approx -\frac{K I_m l \sin(\theta)}{4\pi r}$$

$$= -\frac{K I_m l \frac{y}{(x^2+y^2)^{0.5}}}{4\pi(x^2+y^2)^{0.5}}$$

$$= -\frac{K I_m l}{4\pi} y(x^2+y^2)^{-1}$$

where $x = r\cos(\theta)$, $y = r\sin(\theta)$, $\beta$ is the wave number, r is the radial distance, $\theta$ is the relative orientation angle. Similarly, voltage due to y-directed magnetic dipole transmitter can be approximated as $$V^{Hy} \approx \frac{K I_m l \cos(\theta)}{4\pi r} \tag{3}$$

-continued $$\approx \frac{KI_m l}{4\pi} x(x^2 + y^2)^{-1}$$

A "differential" excitation of a y-directed magnetic dipole combined with a y-directed magnetic dipole of opposite direction (as shown in FIG. 1) would produce:

$$V^{Hy2} - V^{Hy1} = K \frac{\partial E_\phi}{\partial x} \Delta x \quad (4)$$

$$\approx \frac{\partial}{\partial x} \frac{KI_m l \Delta x}{4\pi} x(x^2 + y^2)^{-1}$$

$$\approx \frac{KI_m l \Delta x}{4\pi} ((x^2 + y^2)^{-1} - 2x^2(x^2 + y^2)^{-2})$$

$$\approx \frac{KI_m l \Delta x}{4\pi r^3} (1 - 2\sin^2(\theta))$$

$$\approx \frac{KI_m l \Delta x}{4\pi r^3} \cos(2\theta)$$

Similarly, differential excitation of the two x-directed magnetic dipoles would produce:

$$V^{Hx2} - V^{Hx1} \approx \frac{KI_m l \Delta y}{4\pi r^3} \cos(2\theta) \quad (5)$$

It can be observed that by analyzing the absolute measurements with x-directed and y-directed magnetic dipoles, it is possible to determine the orientation of the pipe as follows $$\theta = \text{angle}(V^{Hy}, -V^{Hx}) \quad (6)$$

By taking a ratio of the absolute measurements to differential excitation measurements for both the x-directed and y-directed excitations, it is possible to obtain the distance to pipe as follows $$r = \frac{\Delta x \cos(2\theta)}{\cos(\theta)} \frac{\left(\frac{V^{Hy2} + V^{Hy1}}{2}\right)}{V^{Hy2} - V^{Hy1}} \quad (7)$$

$$r = \frac{\Delta y \cos(2\theta)}{-\sin(\theta)} \frac{\left(\frac{V^{Hx2} + V^{Hx1}}{2}\right)}{V^{Hx2} - V^{Hx1}} \quad (8)$$

Although equations (7) and (8) both provide a distance to the target well pipe, they have complementing numerical behavior. Equation (7) is numerically most stable when $\theta=180k$, while equation (8) is most stable when $\theta=90+180k$ (k is an integer) due to size of the denominator. The choice of equation for distance calculation is best made based on whichever equation is more stable for a given range of $\theta$.

The above-described embodiments can be used in SAGD applications in practice. However it can be seen from both of equations (7) and (8) that when $\theta=45+90k$, the nominator goes to zero, that indicates that the denominator (the measurement) will also have to go to zero. This is also a numerically unstable condition that comprises a "blind spot" for the differential excitation measurement. This is an area in which the measurements made not be as useful or accurate as other areas.

Figure 3A:
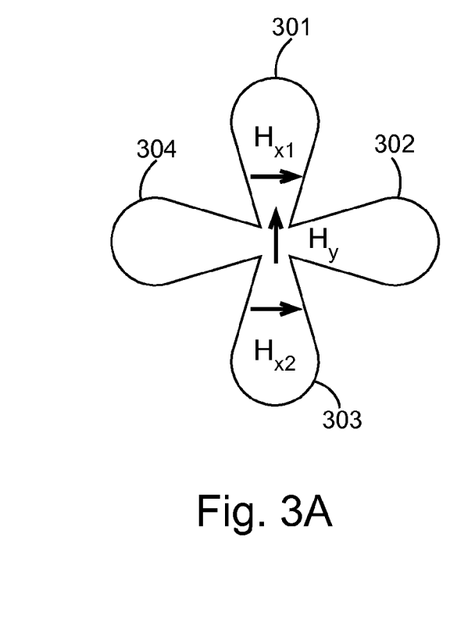
FIGS. 3A-3C illustrate various dipole gradient measurement embodiments.
Figure 3B:
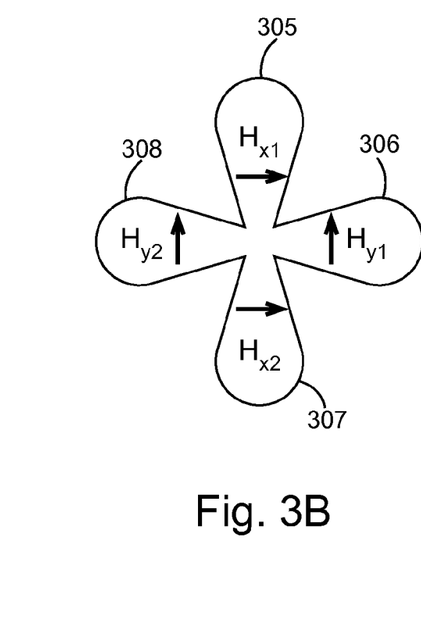
Figure 3C:
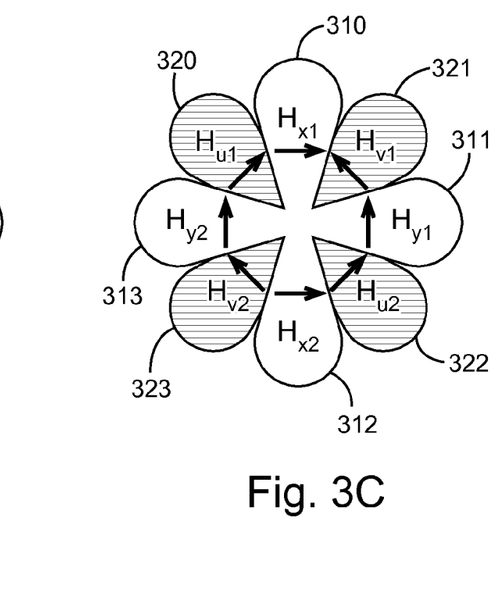

FIGS. 3A-3C illustrate various embodiments for 3-, 4- and 8-dipole excitation measurement configurations, respectively. The different dipole excitation measurement configurations are for purposes of illustration only. There are no limitations on either the number of magnetic dipole transmitters used to generate the different configurations or the number of measurement configurations.

The 3-magnetic dipole transmitter embodiment illustrated in FIG. 3A and the 4-magnetic dipole transmitter embodiment illustrated in FIG. 3B can suffer from the blind spot problem. Each of the magnetic dipole transmitters are represented by $H_y$, $H_{x1}$, $H_{x2}$ for the 3-magentic dipole transmitter embodiment of FIG. 3A and $H_{x1}$, $H_{x2}$, $H_{y1}$, and $H_{y1}$ for the four-magnetic dipole transmitter embodiment of FIG. 3B. In the case of a target that is in x-axis or y-axis direction, the locations having the highest numerical stability points are indicated as locations 301-308. The areas that are in the middle of these locations 301-308, i.e., locations that make 45 degree angle with the x-axis and y-axis, may be considered to be blind spots.

In the third configuration, illustrated in FIG. 3C, the highest sensitivity directions for two sets of dipoles are indicated as locations 310-313 and locations 320-323, respectively, if the target is in x-axis or y-axis direction. If the target is making a 45 degree angle with x-axis or y-axis however, locations 320-323 have the highest sensitivity. As a result, the configuration of FIG. 3C can produce stable results in all of the measurements, while the configurations of FIGS. 3A and 3B may produce unstable results based on the relative orientation of the target well pipe. In a case where the measurements are taken while the drill string is rotated, a large number of measurements can be made at different rotation angles producing the variation that is sufficient to remove selected blind spots.

Each of the magnetic dipole transmitters, when activated (e.g., energized), have magnetic moments. As known in the art, a magnetic moment is a quantity that determines the force that the magnetic dipole transmitters can exert on electric currents and the torque that a magnetic field will exert on the magnetic dipole transmitter. A magnetic dipole transmitter can have a magnetic moment that is in an opposite direction from a magnetic moment of a radially separated magnetic dipole transmitter.

For example, of the four magnetic dipole transmitters $H_{x1}$, $H_{x2}$, $H_{y1}$, and $H_{y2}$ of FIG. 3B, $H_{x1}$ and $H_{x2}$ are radially separated from each other and generate magnetic moments in an opposite direction from each other. Similarly, $H_{y1}$ and $H_{y2}$ are radially separated from each other and generate magnetic moments in an opposite direction from each other. In an embodiment, the radially separated magnetic dipole transmitters may be a substantially equal distance from an axial centerline of the ranging well and in a substantially opposite direction when compared to the other magnetic dipole transmitter of the radially separated magnetic dipole transmitters.

Figure 4A:
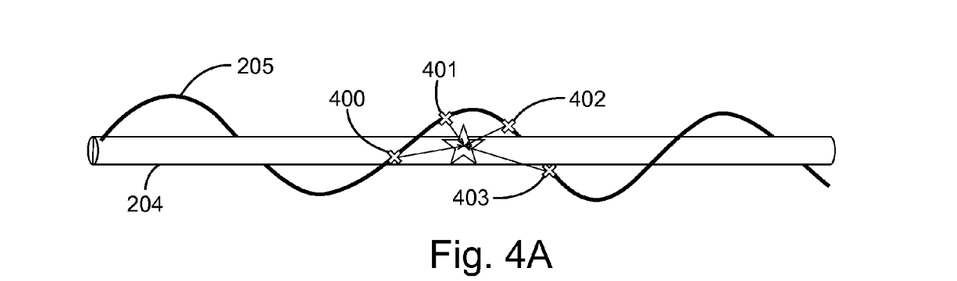
FIGS. 4A and 4B illustrate various embodiments for drilling strategies in accordance with the embodiments of FIGS. 1 and 2.
Figure 4B:
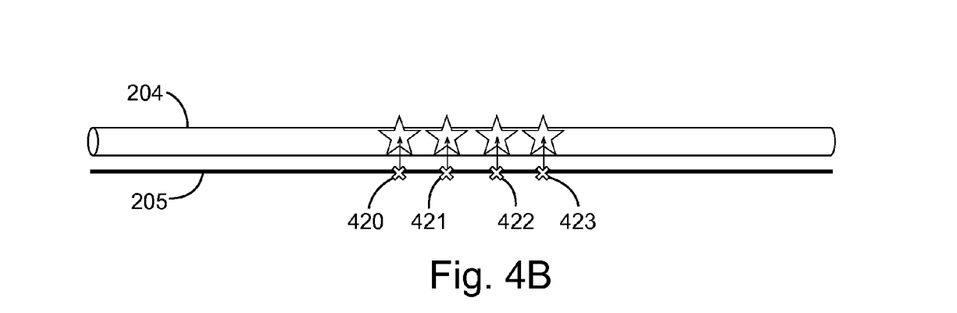

FIGS. 4A and 4B illustrate various embodiments for drilling strategies using the ranging system and ranging methods disclosed herein. FIG. 4A shows a triangulation approach where multiple orientation ($\theta$) measurements 400-403 can be made. These measurements 400-403 can be overlaid on survey data to triangulate the position of the ranging well 205 in relation to the target well 204, as shown.

FIG. 4B shows how ranging can be performed when a reliable distance measurement is available. In this embodiment, there is no need for triangulation and the ranging well 205 can be drilled without spiraling around the target well 204. This embodiment, can be used to help regulate the distance between wells using multiple relative distance measurements 420-423 between the ranging well 205 and the target well 204.

In an embodiment where well intercept is desired, both the embodiment of FIGS. 4A and 4B can be used. In a SAGD application, the embodiment of FIG. 4B can be used since the optimum position for the injector is above the producer due to gravity considerations.

Figure 5:
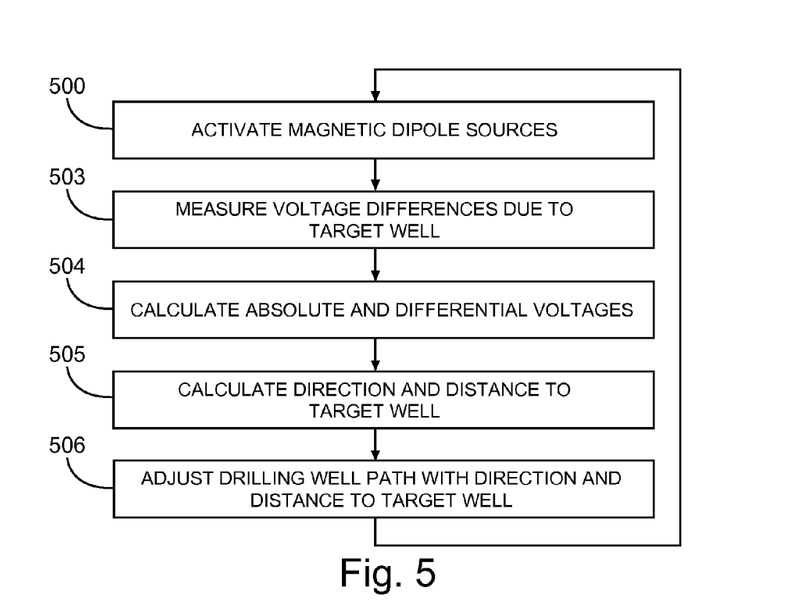
FIG. 5 illustrates a flowchart of an embodiment of a method for ranging.

FIG. 5 illustrates a flowchart of an embodiment of an operation of the ranging system as discussed previously. Initially, one of the ranging well (e.g., injector well) or the target well (e.g., producer well) is drilled. Traditionally, the producer well is drilled first since it has to be placed in the reservoir at the optimum position to yield a greater amount of hydrocarbons. A well placement tool such as azimuthal propagation resistivity tools or an ultra-deep reading resistivity tool can be used to place the producer well at selected distances from adjacent layers in a reservoir. Survey data can be collected in the drilling of this first well to aid the guiding of the second well.

The second well drilling can then be started with the build section guided either with survey information or absolute or gradient information from the ranging tool. After the build section, a procedure to keep the second well parallel and at desired distance to the first well is taken. The disclosed ranging system can allow substantially the same distance or it can follow a prescribed or controlled varying distance based on local characteristics of the formations.

The low noise level that is desired for ranging can be achieved by stopping drilling while ranging measurements are taken. The time between the drilling stop and ranging start can be optimized to reduce noise due to wobbling and also minimize idle time. Similarly duration of ranging activity can be selected to reject electrical system and magnetic environment noise while reducing idle time.

During ranging, the magnetic dipole transmitters and electrode receivers are activated substantially simultaneously 500 from the surface either automatically or with manual operation. During the excitation with the magnetic dipole transmitters, the electrodes may be activated from the surface or by a downhole algorithm that detect the currents of the pipe.

Differential voltage signals, generated due to the AC in the ranging well pipe, are measured 503 between the first and second electrodes. The absolute and differential voltages can then be determined 504 and the relative direction and relative distance to the target well determined 505 using the equations as described above. The drilling well path can be adjusted using the calculated relative direction and relative distance to the target well 506. This method can repeat for as long as the well is being drilled and ranging is desired.

Since the direction and distance results are based on the receiver's coordinate system, a transformation can be done to convert the results to earth or another coordinate system that can be used in geosteering of the drill bit. The Earth's magnetic field or gravity information can be used to measure receiver orientation and achieve the transformation mentioned above.

The ranging procedure described above can be performed at certain depth intervals that improve geosteering accuracy performance and reduce rig time. A priori information can be used to adjust the interval. For example, if the survey data of the first well indicates that the well is expected to be flat, intervals between ranging measurements can be extended. If the well is expected to have dog-legs, ranging measurements can be performed more rapidly. Near the end of a well, currents behave differently compared to other sections since the flow path of current is modified. In order to avoid adverse effects, the first well can be drilled longer than the second well. Based on these scenarios, it is possible to switch to different processing techniques. For example, if it is desired that the second well follow a path that is far from the first well, ranging based on the absolute value can be used locally.

Figure 6A:
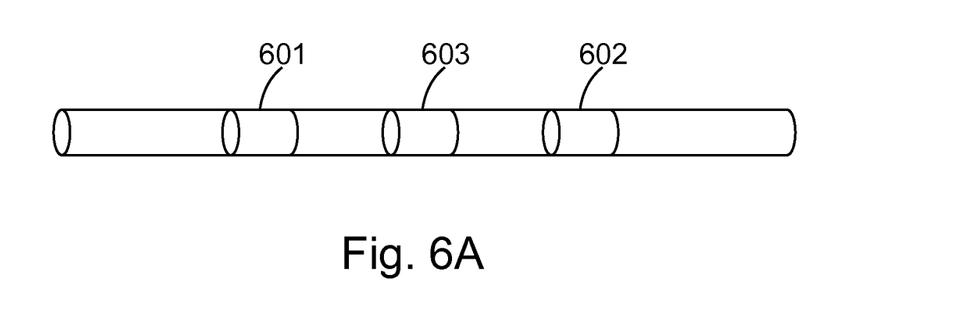
FIGS. 6A-6G illustrate various embodiments of wireline and logging-while-drilling electrode configurations.
Figure 6B:
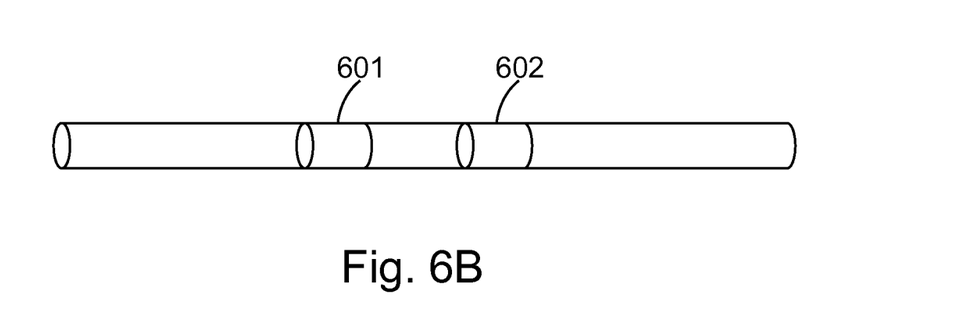
Figure 6C:
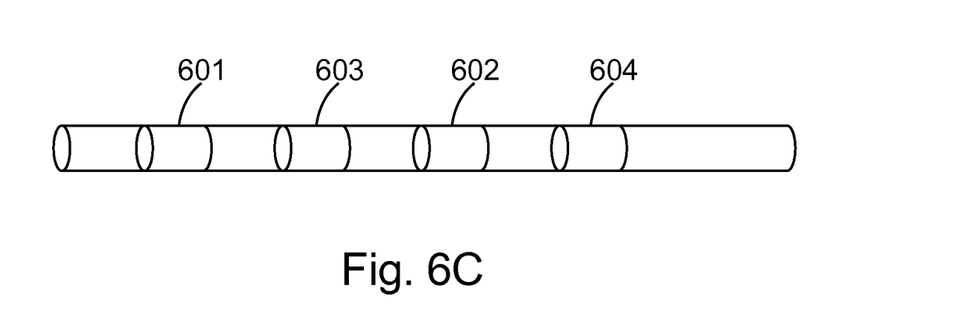
Figure 6D:
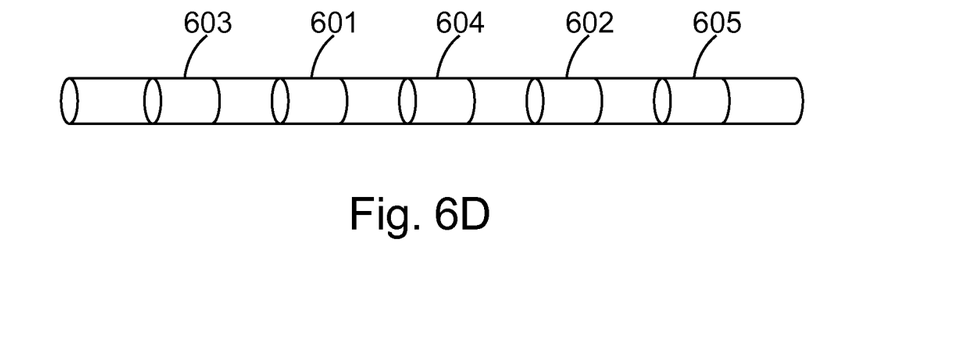
Figure 6E:
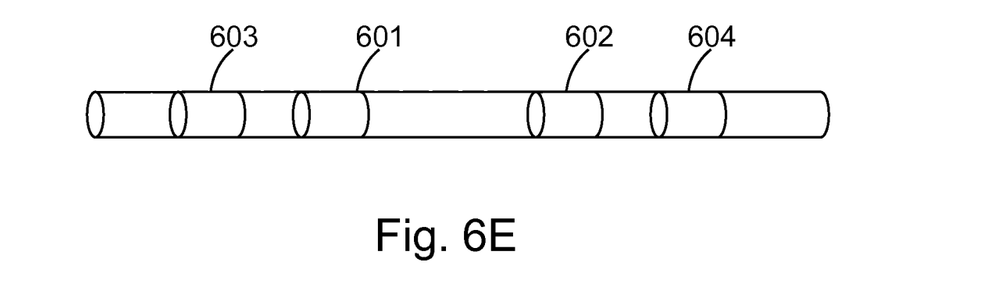
Figure 6F:
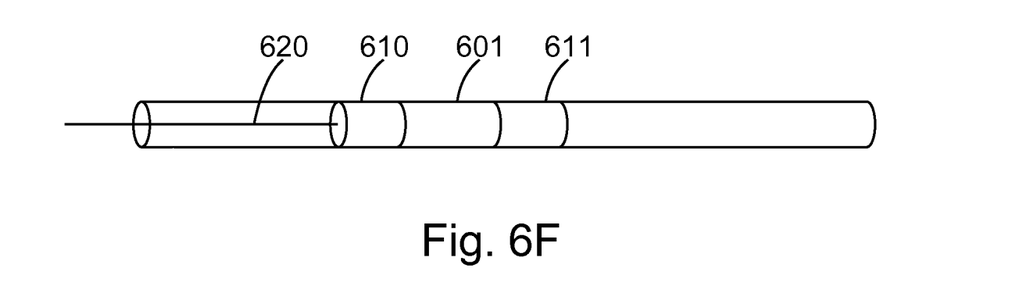
Figure 6G:
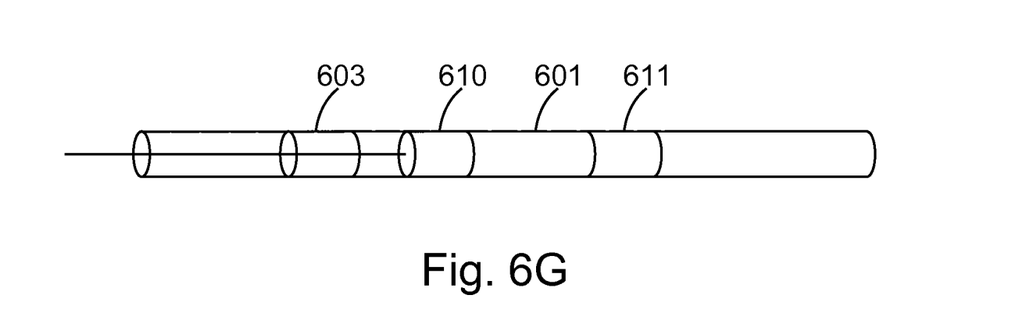

FIGS. 6A-6G illustrate various embodiments of LWD and wireline electrode configurations. FIGS. 6A-6E illustrate LWD embodiments while FIGS. 6F and 6G illustrate wireline embodiments.

The electrodes 601, 602 can be located between 6-90 m away from the transmitters. The electrodes 601, 602 are electrically connected to the drill string with gap subs that may or may not be separating the electrodes 601, 602. This arrangement can increase the voltage measurement by removing the current short between the electrodes 601, 602 and increase the effective outside resistive load of the electrode system. Similarly gap subs 603-605 can be placed above or below the drill string to avoid any direct coupling between the receivers and the transmitters.

For example, FIG. 6A shows a gap sub 603 between the electrodes 601, 602. FIGS. 6C and 6D show alternating electrodes 601, 602 with gap subs 603-605. FIG. 6E shows gap subs 603, 604 on either side of the electrodes 601, 602 that are separated from each other. FIG. 6B shows the electrodes 601, 602 simply separated from each other, without the use of any gap subs.

In all of the embodiments of FIGS. 6A-6E, the electrodes are in electrical contact with the borehole fluid and the geological formation. These embodiments also have the electrodes in electrical contact with a tool mandrel and with the geological formation through the mud.

FIGS. 6F and 6G show a wireline 620 inside a LWD configuration where a wireline tool with the electrode receiver 601 is lowered into the LWD drill string 620. In the embodiments of FIGS. 6F and 6G, the voltage between the measurement electrode 601 and the surface of the geological formation is measured. It is also possible to measure the voltage difference between two wireline electrodes (not shown). Gap subs 603 may be used on the drill string 620 may also help reduce transmitter receiver direct coupling effects.

An unexpected relatively large variation in the pipe current distribution can produce either small measured voltages between the electrodes or flipping of the sign of the measured voltage. The problem with the small measured voltages can be addressed by utilizing a different excitation frequency for the AC or a different position of the magnetic dipole transmitter apparatus that can produce a different current distribution on the ranging well pipe.

Figure 7A:
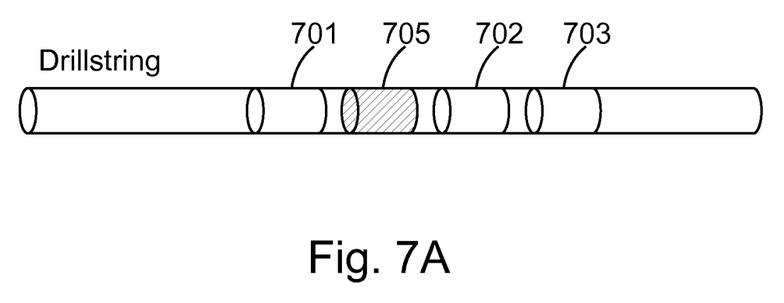
FIGS. 7A and 7B illustrate various embodiments of electrode-array configurations.
Figure 7B:
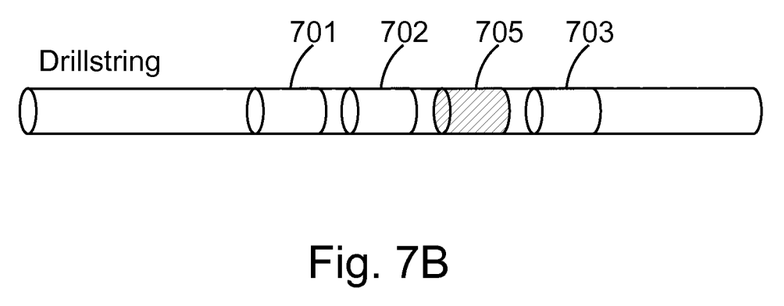

Voltage sign reversal can be detected based on a comparison between past measurements or different frequency or source positions. FIGS. 7A and 7B show embodiments with an electrode array configuration where more than two electrodes 701-703 are used in the voltage measurement. A gap sub 705 can be used in various locations of the electrode array.

Figure 8:
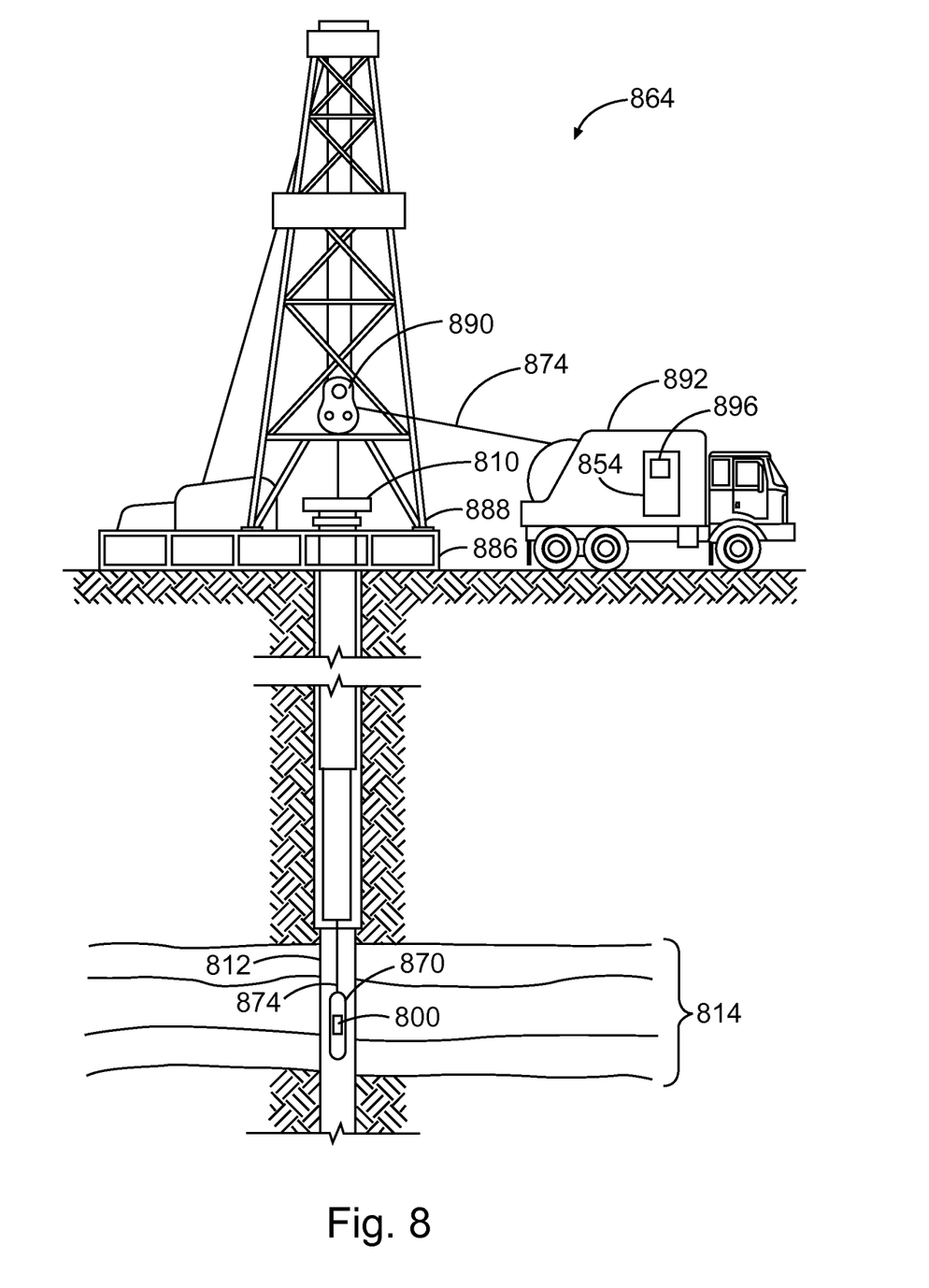
FIG. 8 illustrates a wireline system.
Figure 9:
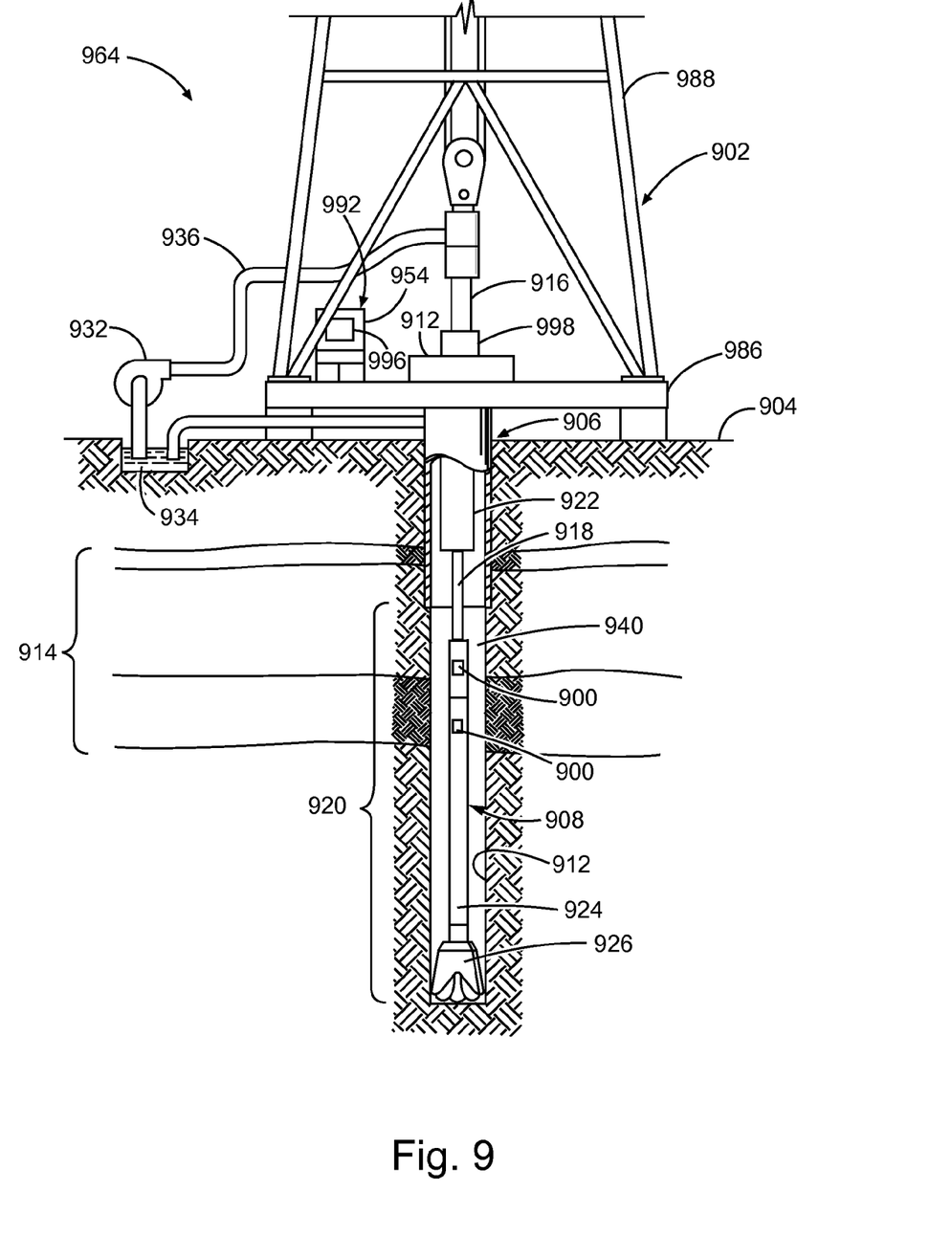
FIG. 9 illustrates a drilling rig system.

FIG. 8 illustrates a wireline system 864 embodiment as part of a target well 812, as illustrated in FIGS. 2A and 2B. FIG. 9 illustrates a drilling rig system 964 embodiment as part of a ranging well 912, as illustrated in FIGS. 2A and 2B. During a drilling operation of the ranging well 912, as illustrated in FIG. 9, it may be desirable to know the distance between the ranging well 912 and the already drilled target well 812 of FIG. 8.

The system 864 of FIG. 8 may comprise portions of a tool body 870 as part of a wireline logging operation that includes one or more of the electrodes 800 as described previously. The system of FIG. 9 may comprise a downhole tool 924, as part of a downhole drilling operation, that includes the magnetic dipole transmitter apparatus as described previously.

FIG. 8 shows a drilling platform 886 that is equipped with a derrick 888 that supports a hoist 890. Drilling of oil and gas wells is commonly carried out using a string of drill pipes connected together so as to form a drilling string that is lowered through a rotary table 810 into a wellbore or borehole 812. Here it is assumed that the drilling string has been temporarily removed from the borehole 812 to allow a wireline logging tool body 870, such as a probe or sonde, to be lowered by wireline or logging cable 874 into the borehole 812. Typically, the tool body 870 is lowered to the bottom of the region of interest and subsequently pulled upward at a substantially constant speed.

During the drilling of the nearby ranging well, measurement data can be communicated to a surface logging facility 892 for storage, processing, and/or analysis. At least one of the above-described electrodes 800 for ranging between the ranging well and a target well may be part of the wireline logging tool body 870. The logging facility 892 may be provided with electronic equipment 854, 896 for various types of signal processing, which may be used by any one or more of the electrodes 800. Similar formation evaluation data may be gathered and analyzed during drilling operations (e.g., during LWD operations, and by extension, sampling while drilling).

FIG. 9 shows a system 964 that may also include a drilling rig 902 located at the surface 904 of a well 906. The drilling rig 902 may provide support for a drill string 908. The drill string 908 may operate to penetrate a rotary table for drilling a borehole 912 through subsurface formations 914. The drill string 908 may include a Kelly 916, drill pipe 918, and a bottom hole assembly 920, perhaps located at the lower portion of the drill pipe 918.

The bottom hole assembly 920 may include drill collars 922, a downhole tool 924, and a drill bit 926. The drill bit 926 may operate to create a borehole 912 by penetrating the surface 904 and subsurface formations 914. The downhole tool 924 may comprise any of a number of different types of tools including MWD (measurement while drilling) tools, LWD tools, and others.

During drilling operations, the drill string 908 (perhaps including the Kelly 916, the drill pipe 918, and the bottom hole assembly 920) may be rotated by the rotary table. In addition to, or alternatively, the bottom hole assembly 920 may also be rotated by a motor (e.g., a mud motor) that is located downhole. The drill collars 922 may be used to add weight to the drill bit 926. The drill collars 922 may also operate to stiffen the bottom hole assembly 920, allowing the bottom hole assembly 920 to transfer the added weight to the drill bit 926, and in turn, to assist the drill bit 926 in penetrating the surface 904 and subsurface formations 914.

During drilling operations, a mud pump 932 may pump drilling fluid (sometimes known by those of skill in the art as "drilling mud") from a mud pit 934 through a hose 936 into the drill pipe 918 and down to the drill bit 926. The drilling fluid can flow out from the drill bit 926 and be returned to the surface 904 through an annular area 940 between the drill pipe 918 and the sides of the borehole 912. The drilling fluid may then be returned to the mud pit 934, where such fluid is filtered. In some embodiments, the drilling fluid can be used to cool the drill bit 926, as well as to provide lubrication for the drill bit 926 during drilling operations. Additionally, the drilling fluid may be used to remove subsurface formation 914 cuttings created by operating the drill bit 926.

In some embodiments, the system 964 may include a display 996 to present voltage information as measured by the electrodes 800 and generated in response to the magnetic dipole transmitter apparatus 900. This information can be used in steering the drill bit 926 during the drilling operation as described previously. The system 964 may also include computation logic, perhaps as part of a surface logging facility 992, or a computer workstation 954, to receive signals from transmitters and receivers, and other instrumentation to determine the distance to the target well 812.

It should be understood that the apparatus and systems of various embodiments can be used in applications other than those described above. The illustrations of systems 864, 964 are intended to provide a general understanding of the structure of various embodiments, and they are not intended to serve as a complete description of all the elements and features of apparatus and systems that might make use of the structures described herein.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description and the figures, with each claim standing on its own as a separate embodiment.

What is claimed is:

1. A system comprising:
   a first magnetic dipole transmitter located in a ranging well;
   a second magnetic dipole transmitter located in the ranging well, wherein the second magnetic dipole transmitter is radially, axially, or azimuthally separated from the first magnetic dipole transmitter;
   a voltage measurement device comprising a plurality of probes wherein each probe is conductively coupled to one of a target well, the ranging well, or a geological formation, and wherein a first probe of the plurality of probes is conductively coupled to the target well and a second probe of the plurality of probes is conductively coupled to the geological formation; and
   a controller coupled to the voltage measurement device to calculate a distance or relative direction between the target well and the ranging well based on a ratio of voltage difference measurements measured by the plurality of probes, wherein the voltage difference measurements are induced by the first magnetic dipole transmitter and the second magnetic dipole transmitter.

2. The system of claim 1, wherein the first probe is connected to a wellhead of the target well.

3. The system of claim 1, wherein the plurality of probes is connected to axially separated points in the target well.

4. The system of claim 1, wherein the plurality of probes is connected to axially separated points in the ranging well.

5. The system of claim 4, wherein the plurality of probes is connected to a bottom hole assembly (BHA) and separated from the BHA by a gap sub.

6. The system of claim 1, wherein the second magnetic dipole transmitter has a magnetic moment in an opposite direction from a magnetic moment of the first magnetic dipole transmitter.

7. The system of claim 6, wherein the second magnetic dipole transmitter is a substantially equal distance from an axial centerline of the ranging well and in a substantially opposite direction when compared to the first magnetic dipole transmitter, and wherein calculating the distance comprises calculating the distance based on a first ratio.

8. A method for ranging between a ranging well and a target well, the method comprising:
activating a first magnetic dipole transmitter in the ranging well;
activating a second magnetic dipole transmitter in the ranging well, wherein the second magnetic dipole transmitter is radially, axially, or azimuthally separated from the first magnetic dipole transmitter;
sensing a voltage difference between a pair of probes, wherein a first probe of the pair of probes is conductively coupled to the target well, and wherein a second probe of the pair of the pair of probes is conductively coupled to a geological formation; and
determining at least one of a distance or a relative direction between the ranging well and the target well based on a ratio of voltage difference measurements measured by the pair of probes, wherein the voltage difference measurements are induced by the first magnetic dipole transmitter and the second magnetic dipole transmitter.

9. The method of claim 8, further comprising adjusting a drilling operation direction based on at least one of the distance or the relative direction.

10. The method of claim 8, wherein the second magnetic dipole transmitter has a magnetic moment in an opposite direction compared to a magnetic moment of the first magnetic dipole transmitter.

11. The method of claim 10, wherein the second magnetic dipole transmitter is simultaneously active with the first magnetic dipole transmitter.

12. The method of claim 8, further comprising generating an alternating current on the target well with the second magnetic dipole transmitter.

13. The method of claim 11, further comprising generating an alternating current on the target well with three or more magnetic dipole transmitters.

14. The method of claim 10, wherein activating the first magnetic dipole transmitter comprises transmitting a signal from one of: a 3-dipole transmitter, a 4-dipole transmitter, or an 8-dipole transmitter.

15. The method of claim 9, wherein activating the first magnetic dipole transmitter comprises transmitting the alternating current from the first magnetic dipole transmitter coupled to a bottom hole assembly, a drilling assembly, or a wireline tool disposed within the ranging well.

16. A method for ranging between a ranging well and a target well, the method comprising:
lowering a first magnetic dipole transmitter into the ranging well;
lowering a second magnetic dipole transmitter into the ranging well, wherein the second magnetic dipole transmitter is radially, axially, or azimuthally separated from the first magnetic dipole transmitter;
generating an alternating current on the target well with at least one of the first magnetic dipole transmitter and the second magnetic dipole transmitter;
sensing a voltage difference between a pair of probes, wherein a first probe of the pair of probes is conductively coupled to a geological formation and a second probe of the pair of probes is conductively coupled to the target well; and
determining at least one of a distance or a relative direction between the ranging well and the target well based on a ratio of voltage difference measurements measured by the pair of probes, wherein at least one of the voltage difference measurements are indicative of the alternating current.

17. The method of claim 16, further comprising coupling the second probe of the pair of probes to a wellhead of the target well.

18. The method of claim 16, further comprising locating a second pair of probes at axially separated points in the target well.

19. The method of claim 16, further comprising locating a second pair of probes at axially separated points in the ranging well.

20. The method of claim 16, further comprising locating a second pair of probes in a bottom hole assembly (BHA) wherein the pair of probes are separated by a gap sub.

21. The method of claim 16, further comprising a second pair of probes that are part of a wireline tool.

22. The method of claim 16, further comprising sensing an absolute voltage between the pair of probes based on the alternating current on the target well.

23. The system of claim 7, wherein calculating the distance further comprises calculating the distance based on an angular orientation of the target well.

24. The system of claim 23, wherein the first ratio comprises a first trigonometric function of the angular orientation and a second trigonometric function of the angular orientation.

25. The system of claim 24, wherein the distance is calculated as a product of the first ratio multiplied by a second ratio of measurements.

26. The system of claim 25, wherein the distance is calculated as:

$$r = \frac{\Delta x \cos(2\theta)}{\cos(\theta)} \frac{\left(\frac{V^{Hy2} + V^{Hy1}}{2}\right)}{V^{Hy2} - V^{Hy1}},$$

wherein r is the distance, $\theta$ is the angular orientation, $V^{Hy1}$ is a measurement measured by the first magnetic dipole transmitter, $V^{Hy2}$ is a measurement measured by the second magnetic dipole transmitter, and $\Delta x$ is a position change of the first magnetic dipole transmitter during measurement of $V^{Hy1}$.

27. The system of claim 1, wherein the second probe is connected to a surface of the geological formation.

28. The method of claim 8, wherein the first probe of the plurality of probes is connected to a wellhead of the target well.

29. The method of claim 16, wherein the second probe is connected to a surface of the geological formation.

* * * * *